United States Patent
Marokhovsky

(10) Patent No.: US 7,353,358 B1
(45) Date of Patent: Apr. 1, 2008

(54) SYSTEM AND METHODS FOR REPORTING STORAGE UTILIZATION

(75) Inventor: Serge Marokhovsky, Upton, MA (US)

(73) Assignee: EMC Corporation, Hopkinton, MA (US)

(*) Notice: Subject to any disclaimer, the term of this patent is extended or adjusted under 35 U.S.C. 154(b) by 503 days.

(21) Appl. No.: 10/881,331

(22) Filed: Jun. 30, 2004

(51) Int. Cl.
G06F 12/00 (2006.01)
G06F 7/00 (2006.01)

(52) U.S. Cl. ............... 711/170; 711/100; 707/102; 709/223; 709/224

(58) Field of Classification Search ............ 711/170
See application file for complete search history.

(56) References Cited

U.S. PATENT DOCUMENTS

| | | | | |
|---|---|---|---|---|
| 6,128,016 A | * | 10/2000 | Coelho et al. | 715/808 |
| 2003/0009444 A1 | * | 1/2003 | Eidler et al. | 707/1 |
| 2004/0078461 A1 | * | 4/2004 | Bendich et al. | 709/224 |
| 2004/0230900 A1 | * | 11/2004 | Relyea et al. | 715/513 |

OTHER PUBLICATIONS

EMC Corp., "Using EMC ControlCenter StorageScope to Support Storage Chargeback," Engineering White Paper, May 2003, pp. 1-12.*
EMC Corp., "EMC ControlCenter StorageScope," Data Sheet, Oct. 2003, pp. 1-4.*
EMC Corp., "EMC ControlCenter SRM Monitoring and Reporting," Data Sheet, May 2004, pp. 1-7.*
EMC Corp., "EMC ControlCenter 5.2 Storage Allocation Terminology," Engineering White Paper, Jun. 8, 2004, pp. 1-25.*
EMC Corp., "EMC ControlCenter 5.2 Storage Architecture Terminology," Engineering White Paper, Jun. 8, 2004, pp. 1-20.*
EMC Corp., "A Practical Guide to SRM Monitoring and Reporting," Engineering White Paper, Jun. 23, 2004, pp. 1-29.*

* cited by examiner

*Primary Examiner*—Matthew Kim
*Assistant Examiner*—Michael Krofcheck
(74) *Attorney, Agent, or Firm*—Chapin IP Law, LLC; Barry W. Chapin, Esq.

(57) ABSTRACT

Storage arrays are subdivided into a plurality of physical and logical entities to provide a framework of the available storage. In a large SAN, the network of storage arrays may define a complex arrangement of such physical and logical entities to partition the total storage volume. Therefore, the storage area network classifies a series of storage categories corresponding to different levels of the physical and logical entities representing subdivisions of the storage. In the storage array, designated storage is often not immediately employed for storing active data. In the enumerated storage categories, storage is apportioned from the previous category level in a progressive manner. Storage utilization reports which simultaneously display a plurality of storage category levels, and compute designated and free storage capacity at each level, indicate underutilized or potential available storage which may be obscured by imprecise or overly generous storage allotment estimates. The storage categories therefore identify a manner in which the available storage area is allotted, or apportioned.

12 Claims, 9 Drawing Sheets

| Array Type | Raw - Total (GB) | Configured - Raw (GB) | Configured - Usable (GB) | Allocated - Raw - Total (GB) | Allocated - Usable - Total (GB) | Accessible - Total (GB) 522 | Accessible - Used (GB) 524 | Accessible - Free - No Vol Grps (GB) 526 | Accessible - Free - No FS/DB (GB) 528 | File System - Total (GB) | File System - Used (GB) | Raw Database - Total (GB) | Raw Database - Used (GB) | A | D |
|---|---|---|---|---|---|---|---|---|---|---|---|---|---|---|---|
| Clariian | 4,010.39 | 1,948.79 | 1,426.63 | 600.15 | 467.65 | 333.00 | 168.55 | 243.00 | 163.00 | 168.55 | 62.22 | 0.00 | 0.00 | | |
| Symmetrix | 2,047.25 | 1,124.41 | 688.72 | 963.92 | 587.32 | 269.81 | 84.23 | 177.06 | 185.52 | 84.23 | 44.33 | 0.00 | 0.00 | | |
| Clariian | 5,997.48 | 5,896.83 | 4,371.11 | 1,486.01 | 1,109.45 | 250.00 | 59.99 | 190.00 | 190.00 | 59.99 | 50.95 | 0.00 | 0.00 | | |
| Symmetrix | 16,407.94 | 2,839.00 | 1,794.65 | 260.31 | 150.30 | 86.08 | 56.04 | 58.62 | 18.33 | 56.04 | 27.07 | 0.00 | 0.00 | | |
| HPXP | 0.00 | 868.46 | 651.34 | 28.17 | 21.12 | 11.59 | 11.45 | 0.10 | 0.13 | 11.45 | 11.45 | 0.00 | 0.00 | | |
| HPXP | 0.00 | 7,807.17 | 4,633.06 | 4,518.13 | 2,689.87 | 147.13 | 0.01 | 106.43 | 133.57 | 0.01 | 0.01 | 0.00 | 0.00 | | |
| Symmetrix | 2,115.49 | 433.31 | 221.23 | 193.28 | 96.64 | 0.02 | 0.00 | 0.00 | 0.02 | 0.00 | 0.00 | 0.00 | 0.00 | | |
| Symmetrix | 2,183.73 | 981.56 | 798.44 | 173.74 | 320.16 | 0.02 | 0.00 | 0.00 | 0.02 | 0.00 | 0.00 | 0.00 | 0.00 | | |
| ESS | 1,164.00 | 728.00 | 526.20 | 82.15 | 64.70 | 54.70 | 0.00 | 51.70 | 54.70 | 0.00 | 0.00 | 0.00 | 0.00 | | |
| Symmetrix | 0.00 | 0.00 | 0.00 | 0.00 | 0.00 | 0.00 | 0.00 | 0.00 | 0.00 | 0.00 | 0.00 | 0.00 | 0.00 | | |
| Symmetrix | | | | | | 0.00 | 0.00 | 0.00 | 0.00 | 0.00 | 0.00 | 0.00 | 0.00 | | |

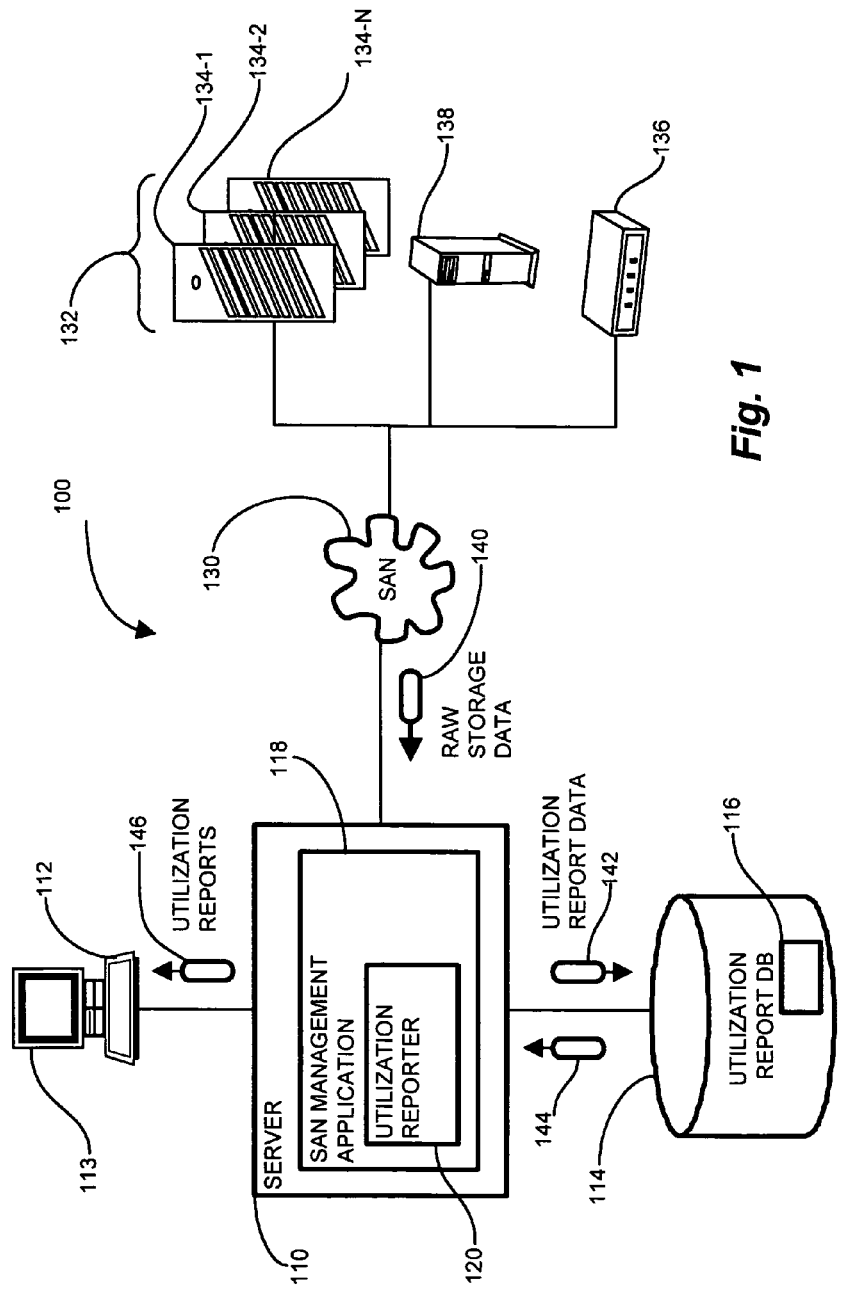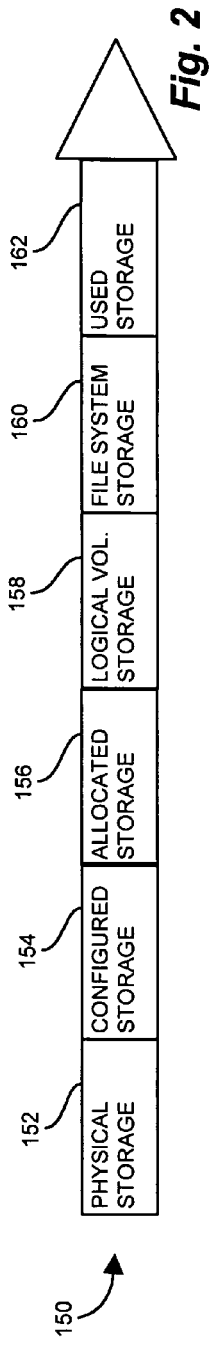

| Report Date | Feb 5, 2004 | | Time | 1:45 PM ▼ | Layout | Raw Summary ▼ | | | Print 🖨 Export ⏏ |
|---|---|---|---|---|---|---|---|---|---|
| Arrays - Raw Summary 170-11 | | | | | Only 10% of the total capacity has been allocated 170-12 | | | | About this page ? |
| Array | Array Type | Raw - Total (GB) ▼ | | Configured - Raw (GB) | Unconfigured - Total (GB) | | Allocated - Raw - Total (GB) | | Unallocated - Raw - Total (GB) |
| 000187700037 | Symmetrix | 39,105.58 | | 32,360.07 | 6,689.65 | | 12,926.64 | | 19,433.43 |
| 000184799999 | Symmetrix | 17,228.33 | 502 | 4,225.79 | 13,002.55 | | 1,638.90 | 504 | 2,586.89 |
| 000187400019 | Symmetrix | 9,844.76 | | 6,217.74 | 3,609.05 | | 4,260.64 | | 1,878.31 |
| 3D471 | HPXP | 7,966.88 | | 7,958.71 | 6.13 | | 5,423.87 | | 2,374.48 |
| 000000005601 | Symmetrix | 6,426.44 | | 2,869.57 | 3,545.14 | | 719.35 | | 2,150.22 |
| APM00034701854 | Clariion | 6,015.59 | | 3,128.29 | 2,807.27 | | 959.20 | | 411.29 |
| 000000006165 | Symmetrix | 4,922.38 | | 4,006.67 | 906.72 | | 2,279.93 | | 1,753.41 |
| 000187900038 | Symmetrix | 4,101.98 | | 3,391.54 | 666.79 | | 70.15 | | 3,330.43 |

| Administration | | | | | | | | | | | |
|---|---|---|---|---|---|---|---|---|---|---|---|
| Time 4:02 AM ▸ Layout oso77_utilization ▸ | | | | | | | Home  Help  Doc. Library  Logoff | | | | |
| | | | | | | | 150  Print  Export  Logoff | | | | |
| | 170-21 | 170-22 | 170-22 | 170-23 | 170-23 | 170-24 Rows 1-32 of 32 | 170-24 | 170-24 | 170-24 | 170-26 | 170-25 |
| Array Type | Raw - Total (GB) | Configured - Raw (GB) | Configured - Usable (GB) | Allocated - Raw - Total (GB) | Allocated - Usable - Total (GB) | Accessible - Total (GB) 522 | Accessible - Used (GB) ▼ 524 | Accessible - Free - No Vol Grps (GB) 526 | Accessible - Free - No FS/DB (GB) 528 | File System - Total (GB) | File System - Used (GB) | Raw Database - Total (GB) | Raw Database - Used (GB) |
| Clariion | 4,010.39 | 1,948.79 | 1,426.63 | 600.15 | 467.65 | 333.00 | 168.55 | 243.00 | 163.00 | 168.55 | 62.22 | 0.00 | 0.00 |
| Symmetrix | 2,047.25 | 1,124.41 | 688.72 | 963.92 | 587.32 | 269.81 | 84.23 | 177.06 | 185.52 | 84.23 | 44.33 | 0.00 | 0.00 |
| Clariion | 5,997.48 | 5,896.83 | 4,371.11 | 1,486.01 | 1,109.45 | 250.00 | 59.99 | 190.00 | 190.00 | 59.99 | 50.95 | 0.00 | 0.00 |
| Symmetrix | 16,407.94 | 2,839.00 | 1,794.65 | 260.31 | 150.30 | 86.08 | 56.04 | 58.62 | 18.33 | 56.04 | 27.07 | 0.00 | 0.00 |
| HPXP | 0.00 | 868.46 | 651.34 | 28.17 | 21.12 | 11.59 | 11.45 | 0.10 | 0.13 | 11.45 | 11.45 | 0.00 | 0.00 |
| HPXP | 0.00 | 7,807.17 | 4,633.06 | 4,518.13 | 2,689.87 | 147.13 | 0.01 | 106.43 | 133.57 | 0.01 | 0.01 | 0.00 | 0.00 |
| Symmetrix | 2,115.49 | 433.31 | 221.23 | 193.28 | 96.64 | 0.02 | 0.00 | 0.00 | 0.02 | 0.00 | 0.00 | 0.00 | 0.00 |
| Symmetrix | 2,183.73 | 981.56 | 798.44 | 173.74 | 320.16 | 0.02 | 0.00 | 0.00 | 0.02 | 0.00 | 0.00 | 0.00 | 0.00 |
| ESS | 1,164.00 | 728.00 | 526.20 | 82.15 | 64.70 | 54.70 | 0.00 | 51.70 | 54.70 | 0.00 | 0.00 | 0.00 | 0.00 |
| Symmetrix | 0.00 | 0.00 | 0.00 | 0.00 | 0.00 | 0.00 | 0.00 | 0.00 | 0.00 | 0.00 | 0.00 | 0.00 | 0.00 |
| Symmetrix | | | | | | | | | | | | | |

SYSTEM AND METHODS FOR REPORTING STORAGE UTILIZATION

BACKGROUND OF THE INVENTION

Conventional managed information environments typically include a plurality of interconnected manageable entities. In such an environment including a storage area network (SAN), the manageable entities may include storage arrays, connectivity devices and database entities, collectively operable to provide information storage and retrieval services to users. In the storage area network, various system administration activities are performed at various times to monitor and maintain the storage area network at an optimal level of operation. In modern managed information systems, system administration often includes invoking a graphical user interface (GUI) to perform a variety of system administration activities.

In a typical storage area network, a console is employed to operate the GUI for managing the storage area network. The console has a user interface display and couples to a server which is interconnected to the manageable entities via the SAN. In the conventional SAN, agents execute on various manageable entities for implementing the management operations emanating from the console. The console also receives informational reports from the server concerning operational details of the manageable entities. Such informational reports provide a SAN operator with information for making decisions about further administrative operations and actions to perform in order to maintain the SAN.

SUMMARY

Conventional managed information environments typically employ a network management application such as an SNMP (Simple Network Management Protocol) application to oversee and administrate the network. The conventional network includes a plurality of manageable entities recognized by the network management application which enable the network management application to manipulate the manageable entities. In a conventional storage area network, the manageable entities include storage arrays, which provide high capacity nonvolatile storage to the users of the SAN. A typical storage array represents a physical collection of a plurality of spindles, or conventional disk drives, integrated as a storage repository, collectively providing a large aggregate storage quantity. Further, in a typical SAN, multiple storage arrays are typically employed for data redundancy, backup, standby site capability, and increased storage capacity.

The storage arrays, therefore, are subdivided into a plurality of physical and logical entities to provide a framework of the available storage. In a large SAN, the network of storage arrays may define a complex arrangement of such physical and logical entities to partition the total storage volume. Therefore, the storage area network classifies a series of storage categories corresponding to different levels of the physical and logical entities representing subdivisions of the storage. Each storage category level in the progression corresponds to an increasing level of granularity of storage subdivisions. Therefore, the storage categories define a hierarchy as each level is demarcated into the subdivisions at the respective level. Further, each category level is inclusive of the previous level.

For example, a particular storage array has a total physical capacity depending on the number of physical spindles, or disk drives, installed in the storage array. The total physical storage capacity is subdivided into one or more configured storage subdivisions, representing available storage available to a particular collection of users. The configured storage is further subdivided into allocated storage, logical volumes, and finally file systems, representing a portion of storage designated for a particular purpose, such as an Oracle® database, for example. Such storage categories may span several storage arrays as a logical entity, for example, due to redundancy protocols such as shadowing, mirroring, journaling and other data redundancy mechanisms for facilitating data recovery in the event of catastrophic failure. Therefore, the subdivisions of storage define a hierarchy of storage categories, or levels, representing a complex arrangement for identifying storage which is consumed, or designated as used, at a particular storage category level, and likewise for identifying storage which is available at each of the storage category levels.

Within each of the storage categories, the storage is demarcated, or subdivided according to particular usage. At each particular level, such demarcation generally identifies a portion of the storage for a particular purpose or user, and also designates a portion for overhead, such as file system tables, indices, track/sector linking, and the like. Once the storage is designated, it may become unusable for other users or purposes. However, often such designated storage may not be immediately employed for active data. For example, a file system may designate, or "carve out," a portion of a logical volume for use as a database table. However, the carved out portion may not become completely populated with active data for weeks or months. Nonetheless, such designated storage remains "used" from the perspective of the file system, meaning that it may not reclaim the designated portion for other uses.

The present invention is based, in part, on the observation that such designated storage is often not immediately employed for storing active data. Designated storage, at each storage category level, may remain idle (i.e. not employed for active data). However, conventional methods of reporting storage occupancy do not provide information concerning each storage category level of a storage system. Accordingly, a particular storage volume may have a substantial area of storage designated at one level. However, the actual quantity of storage "used," that is, actively written with data, may be substantially smaller. Nonetheless, the designated portion is seen as an unusable area. However, conventional storage utilization methods which report only designated, or "used" storage on one level may be blind to unwritten or recoupable storage on other levels. Therefore, a system manager looking to identify areas of low disk utilization, such as to reallocate storage to areas of greater need, may overlook storage capacity which is effectively unused but submerged, or hidden, in an oversized file system such as employed by a sparse DB table.

Accordingly, the configurations of the invention substantially overcome the shortcomings presented by conventional storage utilization reports by displaying a plurality of storage category levels, and indicating designated and free storage capacity at each level, thereby also indicating potential available storage which may be obscured by imprecise or overly generous storage allocation estimates or projections. For example, a particular storage system may have had a substantial portion allocated as logical volumes. However, the logical volumes may be employed by a low demand group of users which does not in fact use much of the allocated storage capacity. Accordingly, a conventional report may simply report only the allocated storage as designated (used), and therefore unavailable for other uses. However, a utilization report including the storage categories for both allocated storage and logical volume storage indicates that, while the allocated storage capacity is substantial, the logical volumes are in fact using only a much smaller portion than that allowed by the allocated portion. Accordingly, the SAN operator may identify some of the allocated storage as not needed by the logical volumes and may reallocate the storage capacity to other uses.

The storage categories identify a manner in which the available storage area is consumed, or apportioned, to users or consumers of the storage area. In the enumerated storage categories, storage is apportioned from the previous category level in a progressive manner. In other words, configured storage is taken from physical storage. Allocated storage draws from configured storage. Logical volumes occupy portions of allocated storage, and so on, along the progression of the storage categories. Different systems may employ alternate criteria and levels for the definitions of the storage categories. Generally, however, once attributed to a particular storage category, the particular quantity of storage is unavailable for other uses.

In further detail the method for generating storage utilization reports in a managed information environment as disclosed and claimed herein includes identifying storage categories in a storage system, in which the storage categories correspond to a hierarchy and are indicative of different levels of demarcation within the storage system, and for each of the identified hierarchical storage categories, computing a storage configuration indicative of storage usage at that level. A utilization reporter computes, within each computed storage configuration, a storage allotment corresponding to used and available storage for the particular storage system. The storage configuration, therefore, includes the storage allotments for a particular storage category. The GUI, in communication with the utilization reporter presents, for a plurality of the identified storage categories, the computed storage allotment. Each level of demarcation of the storage categories is inclusive of previous levels of demarcation. Each computed storage allotment, therefore, is indicative of consumed storage attributable to users, groups, devices, or other storage consumers, for that level.

Each hierarchical storage category is indicative of storage capacity reserved at that level, in which reserved storage is unavailable to other users of the storage. Note that storage reserved at any particular level is not necessarily employed for stored data, but rather indicates that it has been allotted, or apportioned, for or on behalf of a particular storage consumer entity and/or inclusive of overhead or administrative uses such as file tables. The levels of demarcation define a progression, in which each storage category is inclusive of previous storage categories. Each of the storage categories in the progression is therefore indicative of a storage quantity attributable to storage consumers, in which the consumed storage quantity is unavailable to other storage consumers.

Generating the utilization report involves, for each storage category, computing the storage quantity consumed within that category, and displaying the total storage quantity, the consumed quantity and the available quantity. The utilization reports may further include computing a trending analysis indicative of utilization over time by identifying storage areas of a storage array corresponding to user demand, and computing, for a plurality of storage categories, utilization of the storage quantity over time, in which the utilization is indicative of the ratio of a consumed storage quantity to unused storage quantity. The storage categories include physical storage, configured storage, allocated storage, logical volumes, file systems and used storage, each progressively defining further levels of allotment, or apportionment, of storage. Each storage category may also include more specific apportionment. In a particular arrangement, the storage allotment of a storage category is subdivided into accessible storage, accessible with no volume and accessible with no file system/database, in which the accessible storage is indicative of the online storage capability. Other subdivisions to suit particular storage categories may be envisioned, depending on consumers of the storage which may include portions of a storage system including entire devices, user subportions, and group subportions.

In particular configurations, raw storage data is stored in a utilization report database. Such raw storage data may take the form of an XML file or other markup representation, in which computing the utilization report includes parsing a markup file of storage data indicative of the storage utilization, and interpreting the storage data according to a markup language such as XML.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 1 is a context diagram of an exemplary managed information environment including a storage area network and suitable for use with storage utilization reporting;

FIG. 2 is a diagram of the progression of storage categories employed by the utilization reporter;

FIG. 5 is a screen display extraction of an exemplary storage utilization report;

FIG. 6 is a screen display extraction of storage category and storage allotment selection in an exemplary storage utilization report;

FIG. 7 is a screen display extraction of an exemplary storage utilization report as in FIG. 5 in greater detail.

DETAILED DESCRIPTION

Figure 3:
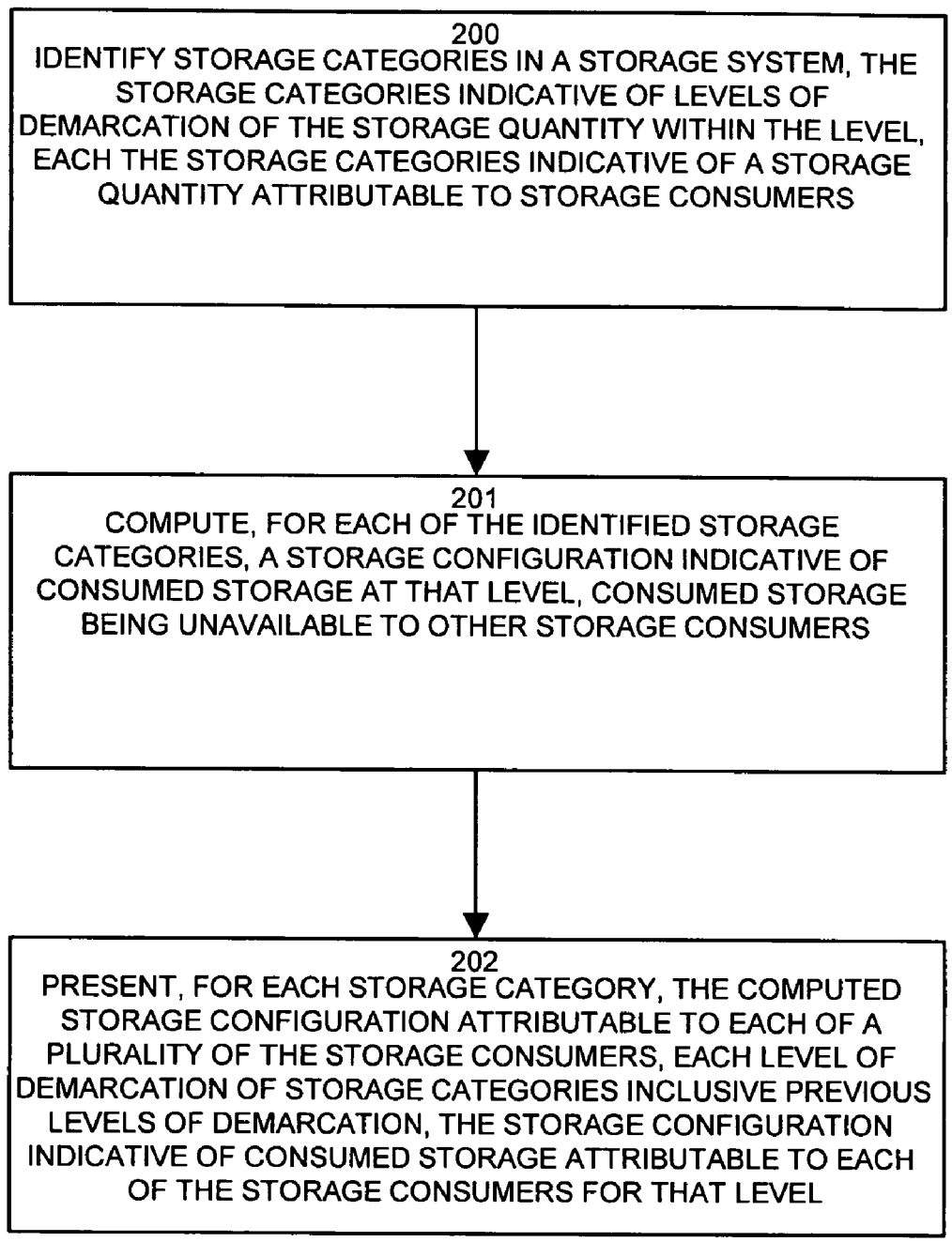
FIG. 3 is a top-level flowchart of storage utilization reporting as described herein.

Typical storage arrays organize storage according to multiple levels of storage categories. Conventional methods of reporting storage occupancy of a storage system (i.e. storage array) may not provide information concerning each storage category level of a storage system. Accordingly, a particular storage volume may have a substantial area of storage designated at one level, while the actual quantity of storage "used," that is, actively written with data, may be substantially smaller. Nonetheless, the designated portion is seen as an unusable area according to the other levels (and for other operations or uses on the same level).

The invention as defined by the present claims is based, in part, on the observation that such designated storage is often not immediately employed for storing active data. Designated storage, at each storage category level, may remain idle (i.e. not employed for active data). However, conventional storage utilization methods which report only designated, or "used" storage on one level may be blind to unwritten or recoupable storage on other levels. Therefore, a system manager looking to identify areas of low disk utilization, such as to reallocate storage to areas of greater need, may overlook storage capacity which is effectively unused but submerged, or hidden, in an oversized file system such as employed by a sparse DB table.

Arrangements of the invention discussed herein substantially overcome the shortcomings presented by conventional storage utilization reports by simultaneously displaying a plurality of storage category levels, and indicating storage allotments of designated (unavailable) and free storage capacity at each level, thereby also indicating potential available storage which may be obscured by imprecise or overly generous storage allocation estimates or projections. In the enumerated storage categories, storage is apportioned from the previous storage category level in a progressive manner. For example, a particular storage system may have had a substantial portion allocated as logical volumes. However, the logical volumes are utilized by a low demand group of users which does not in fact use much of the allocated storage capacity. Accordingly, a conventional report may simply report only the allocated storage as designated (used), and therefore unavailable for other uses. However, a utilization report including the storage categories for both allocated storage and logical volume storage indicates that while the allocated storage capacity is substantial, the logical volumes are in fact using only a much smaller portion than that allowed by the allocated portion. Accordingly, the SAN operator may identify some of the allocated storage as not needed by the logical volumes and may reallocate the storage capacity to other storage consumers (users).

FIG. 1 is a context diagram of an exemplary managed information environment including a storage area network and suitable for use with storage utilization reporting via the utilization reporter 120. Referring to FIG. 1, the managed information environment 100 includes a server 110 interconnected to a plurality of manageable entities 132 via a storage area network (SAN) 130. The server 110 is operable to execute a SAN management application 118, and includes an interface to a console 112 for receiving operator commands and displaying feedback and results. A utilization reporter 120 in the SAN management application 118 couples to a utilization report database 114 having a utilization data table 116 containing utilization report data 142 concerning the storage array entities 134-1 . . . 134-N (134, generally) in the SAN 130.

In the SAN 130, the various interconnected manageable entities 132-1 . . . 132-N (132, generally) maintain associations to other manageable entities 132. Further, the manageable entities 132 may execute software entities, or agent processes (not specifically shown) for gathering and transmitting the raw storage data 140, discussed further below. Each of the manageable entities 132 has a type, such as hosts 138, connectivity elements such as switches 136, and storage arrays 134 such as a Symmetrix®, marketed commercially by EMC Corporation of Hopkinton, Mass., assignee of the present application. The SAN management application 118 stores the raw storage data 140 as utilization report data 142. The utilization reporter 120 retrieves the utilization report data 144 for generating utilization reports 146, displayable by the console 112 on the utilization screen display 113. The utilization report data 142, 144 applies primarily to the storage arrays 134, in the exemplary configuration herein, however the principles for displaying the storage categories as disclosed herein maybe applicable to other configurations as well.

FIG. 2 is a diagram of the progression of storage categories employed by the utilization reporter. In the enumerated storage categories 150 depicted in FIG. 2, the physical storage area 152 of a storage system, such as a disk array 134, is apportioned in a successively inclusive manner. Therefore, the total physical storage 152 is apportioned from the previous category level in a progressive manner. Each successive level in the progression 150 indicates a further apportionment of the previous level. Further, the storage categories 150 also indicate a hierarchical progression, because successive levels may include multiple entities of the previous level. A logical volume storage 160 element may include multiple file systems 160. Allocated storage 156 may include multiple logical volumes 158, and so on. In this manner, the entire storage system 134 is apportioned as follows: configured storage 154 is taken from physical storage 152. allocated storage 156 draws from configured storage 154. logical volumes 158 occupy portions of allocated storage 156. File systems 160 are apportioned from logical volumes 158, and data written as used storage 162 in the file system 160, therefore illustrating the progression of the storage categories 150. Different systems may employ alternate criteria and levels for the definitions of the storage categories, i.e. "allocated" storage may apply differently in different systems. However, the demarcation of levels 150 along a progression will apply, possibly with different numbers of categories and/or differently defined storage categories.

FIG. 3 is a top-level flowchart of storage utilization reporting g as described herein. Referring to FIGS. 1-3, the method for generating storage utilization reports in a managed information environment 100 includes identifying storage categories 150 in a storage system 134, in which the storage categories 150 are indicative of levels of demarcation of the storage within the level, as depicted at step 200. Each storage category 150 is therefore indicative of a storage quantity attributable to storage consumers (e.g. users) for that storage category 150 level.

For each storage category level 150, the utilization reporter 120 computes, a storage configuration, or allotment 170, indicative of consumed storage at that level, in which the consumed storage is therefore unavailable to other storage consumers, as shown at step 201. By displaying a plurality of the storage category levels 150, storage available at a particular level, which may be seen as consumed on another level 150, may be identified. For example, a logical volume category 158 may be allocated 156 a substantial portion of storage, yet the file system 160 on that logical volume 158 is only using a portion of the allocated storage 156. Other permutations and combinations of storage allotments among various storage categories may be envisioned.

The utilization reporter 120 then transmits a utilization report 146 to the console 112 which presents, for each storage category 150, the computed storage allotment (170, FIG. 4, below) attributable to the storage consumers, in which each level of demarcation of storage categories 150 is inclusive of previous levels of demarcation, as depicted at step 202. The storage allotment 170 is therefore indicative of consumed storage attributable to the storage consumers for each level. The utilization report 146, discussed further below, displays a selected set of fields corresponding to each of the storage categories 150 and storage allotment 170 within each of the storage categories 150, for a plurality of storage systems, e.g. storage arrays 134, such as a Symmetrix®.

As will be discussed further below, the simultaneous display of each of a plurality of storage categories 150 at successive levels according to the progression, illustrates usage of storage capacity nested within successive storage categories 150. Storage which is designated as used, or consumed, at one level may, in fact be earmarked but not actually used by the next level of storage category 150. Accordingly, the utilization report 146 illustrating all of the storage categories 150 identifies underutilization at any of the storage levels 150, while conventional reports highlighting only a single level may tend to mask effectively available or underutilized storage at other levels. As the storage categories become successively more specific along the progression of storage categories 150, a hierarchy of allocation is defined, in which the storage is allotted for various consumers (i.e. users) of storage at an increasing level of granularity, i.e. multiple file systems 160, for example, may be allotted from the same physical storage category 152 on a particular storage array 134.

Figure 4:
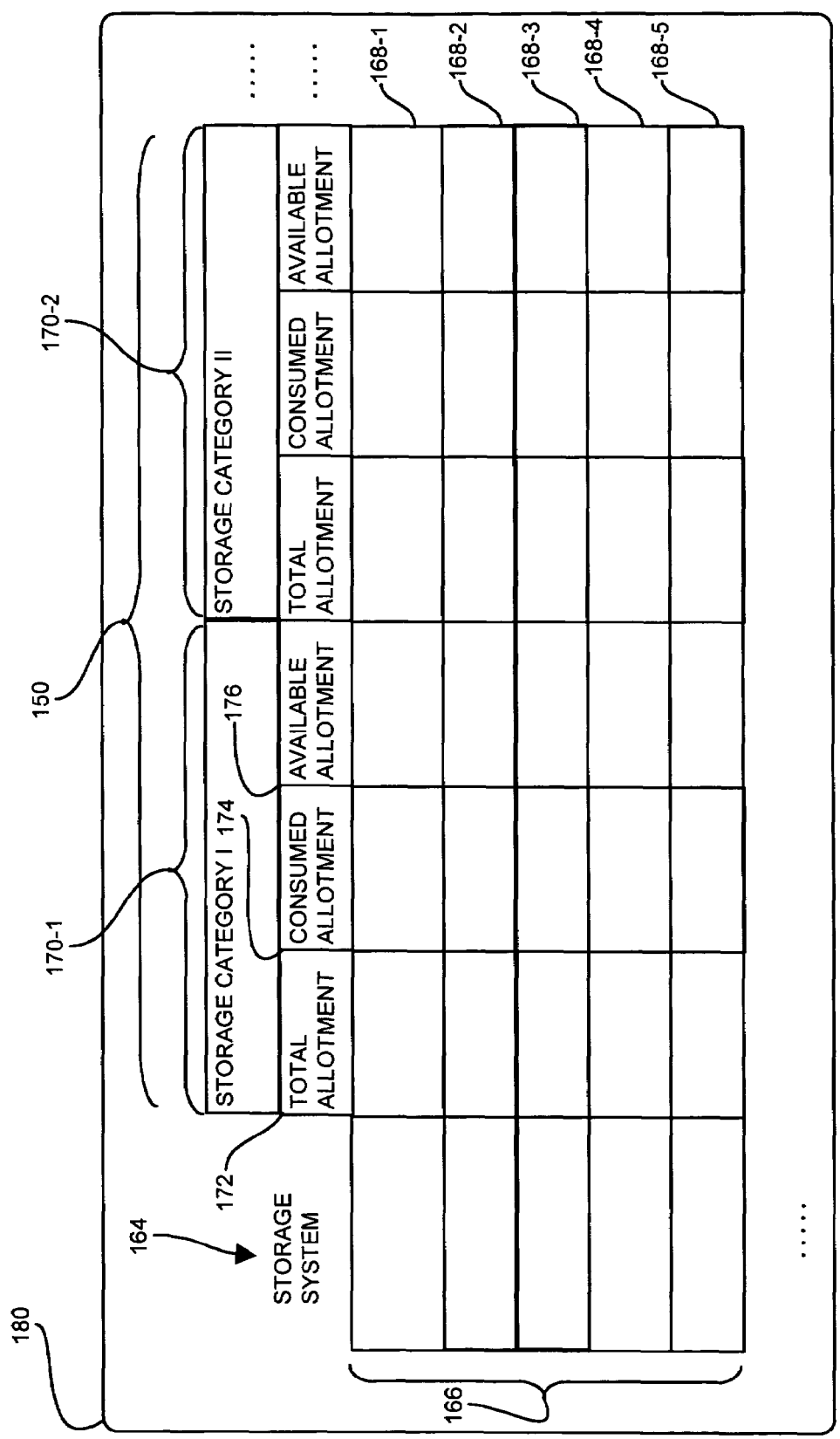
FIG. 4 is a diagram of a screen display suitable for use with the present invention for displaying utilization data reports.

FIG. 4 is a diagram of screen display panes, or windows, suitable for use with the present invention for displaying utilization data reports 146. Referring to FIGS. 1 and 4, the utilization reporter 120 retrieves utilization data 144 from the utilization data set 116, and computes utilization reports 146 for display on the console 112 screen display 113. The screen display 113 is operable to display a plurality of report windows, including the utilization report window 180, for utilization reports including trending reports and efficiency reports, discussed further below.

The utilization report window 180 displays the utilization reports 146 requested by the user. The utilization reports 146 generally follow screen format of the window 180, depending on user requested fields, discussed further in the screen extractions below. The utilization report 146 includes rows 166 consisting of a plurality of row entries 168-1 . . . 168-N (168, generally). Each row entry refers to a storage system 164, such as a Symmetrix or other type of storage array 134. For each storage system 164, the row 168 displays the storage categories 150. Within each storage category 150-N, the storage allotment 170-1 . . . 170-N (170, generally) is broken down. The storage allotment includes the total allotment 172, the consumed allotment 174, and the available allotment 176. Note that the allotment 170 depicts a subdivision, or configuration, of storage within the category 150. Typically the allotment indicate the total as the sum of used and free space, however other factors, such as overhead within the category, may result in the consumed allotment 174 and the available allotment 176 summing to slightly less than the total allotment 172.

The display 180 shows the storage categories 150 and the corresponding storage allotment 170, for each of the selected storage systems 164, in a scrolling format. The storage categories 150, storage allotment 170, and entries 166 are user selectable, and may include a subset of all available fields, discussed further below in the screen extraction examples below. In this manner, the simultaneous display of the storage allotment 170 in a plurality of storage categories 150 allows an operator to identify underutilized storage occurring at any of the levels of the storage categories 150. For example, the allocated storage 156 may indicate near complete utilization of the configured storage 154 allotted, however it may be the case that the logical volumes 158 consume only a small fraction of the allocated storage 156. Therefore, a report 146 of only allocated storage 156 would tend to indicate near complete utilization. A report 146 including the storage category 150 for logical volume storage 158 reveals unused storage, however, masked at the previous storage category 150 level.

FIG. 5 is a screen display of a screen extract 500 of an exemplary storage utilization report. Referring to FIGS. 4 and 5, the entry 168-11 shows the utilization for the storage system 000184799999. Included in the report are storage categories 150 for physical storage 152 and for allocated storage 156. Further, the shown storage allotment 170-11 depicts the raw total storage along with total allocated storage 170-12. Referring to the utilization entry 502, the total storage is 17,228.33 GB, while the utilization entry 504 indicates that allocated storage is only 1638.90 GB. Accordingly, roughly 10% of the total physical storage 152 capacity has been allocated.

Figure 6:
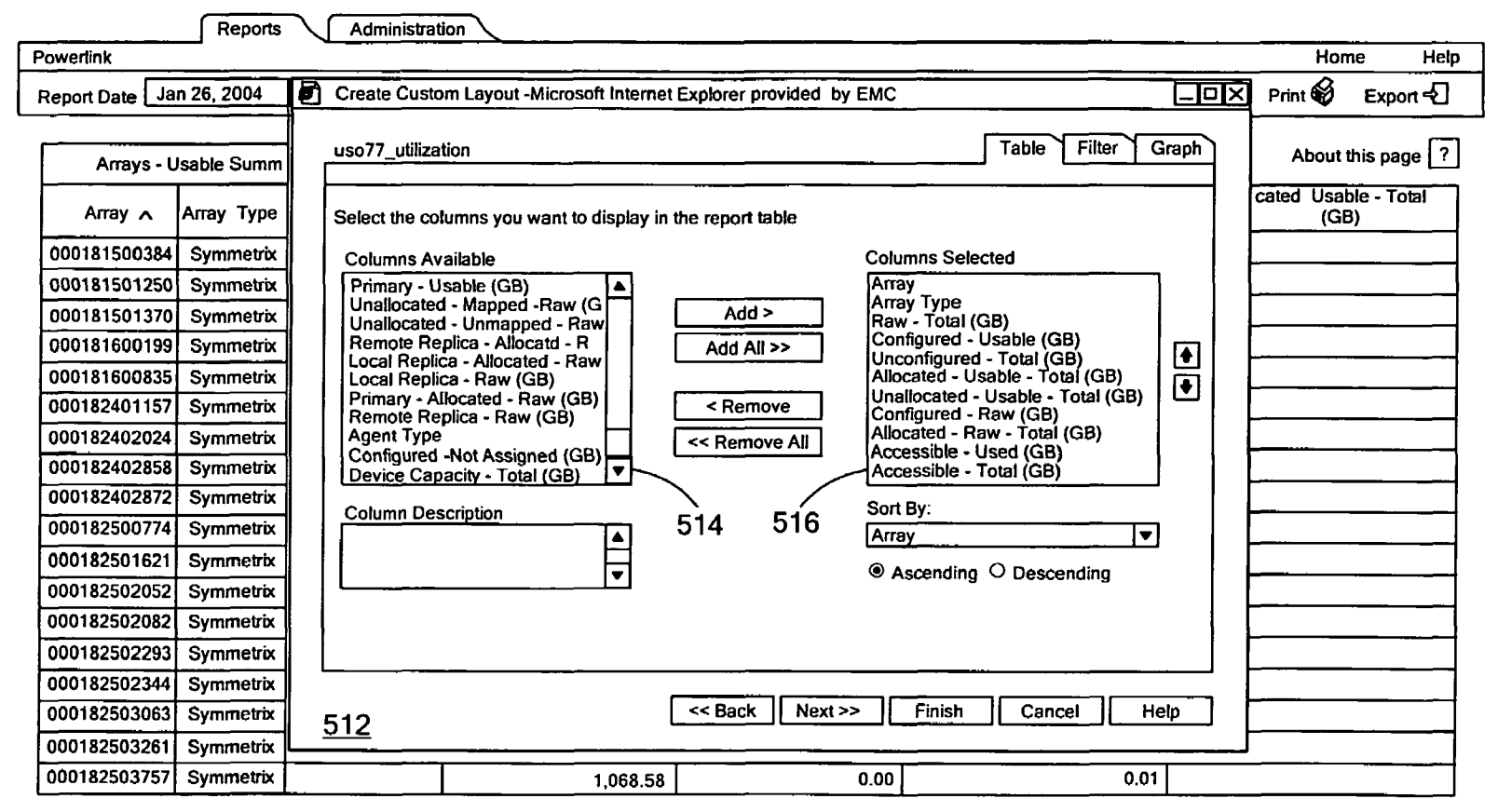

FIG. 6 is a screen display of storage category and storage allotment selection in a screen extract 510 of an exemplary storage utilization report 146. Referring to FIGS. 6 and 4, a storage category selection pane 512 includes a columns available pane 514 and a columns selected pane 516. As indicated above, a storage utilization report screen 180 need not include all permutations of storage categories 150 and storage allotments 170. Accordingly, the columns available pane 514 lists the available storage categories 150 and storage allotments 170 within each available storage category 150. Note that the storage categories 150 and storage allotments 170 within each of the storage categories 150 are listed as individual list items in the columns available pane 514. The columns selected pane 516 allows user selection of the storage categories 150 and allotments 170 desired for display in the current report 510. In this manner, a user or operator focuses on the particular area of contention or suspected under utilization of available storage.

FIG. 7 is a screen display of an exemplary storage utilization report 520 as in FIG. 5 in greater detail. Referring to FIG. 7, a series of selected fields 516 are shown including storage categories 150 and storage allotments 170. For each of the selected fields 516 a series of entries 168 corresponding to storage arrays 164 of various types are included in the report 520. As disclosed in FIG. 6, above, not all storage categories 150 and storage allotments 170 need be included in the report 520. Specifically, the report 520 includes storage allotments 170-21 corresponding to physical storage category 152, 170-22 corresponding to configured storage 154, 170-23 corresponding to allocated storage 156, 170-24 corresponding to logical volume (accessible) storage 158, 170-25 corresponding to file system storage 160, and 170-26 corresponding to used (DB) storage 162. Note further that the storage allotments 170 may indicate further subdivisions for each storage category 150. For example, within accessible storage 170-24, four storage allotments are shown: accessible total 522, accessible used 524, accessible free w/ no volume groups 526, and accessible free with no file system/DB 528. As indicated above, other storage allotments 170 may be applicable to different types of storage categories 150.

Figure 8:
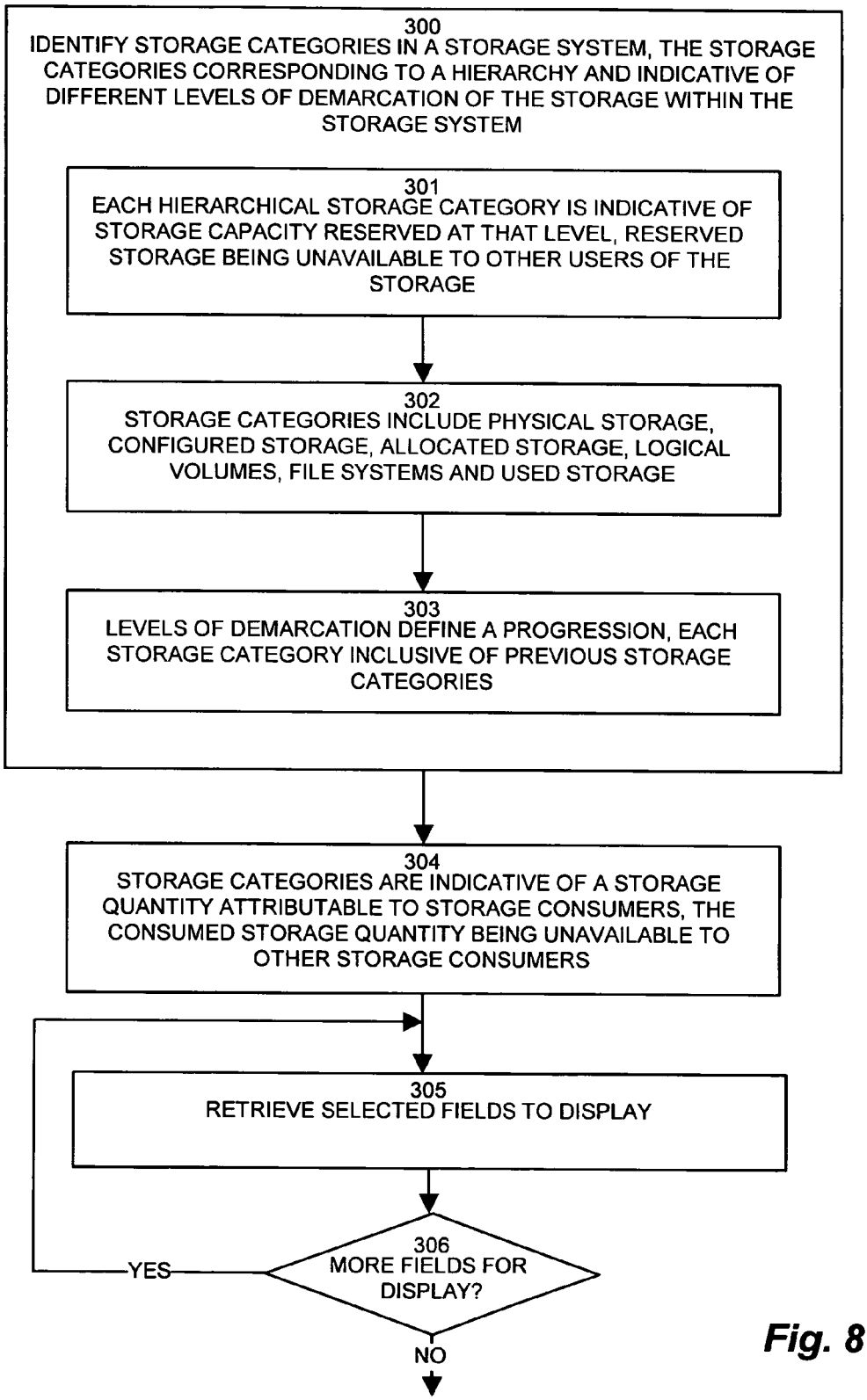
FIGS. 8-10 are a flowchart of storage utilization reporting in greater detail.
Figure 9:
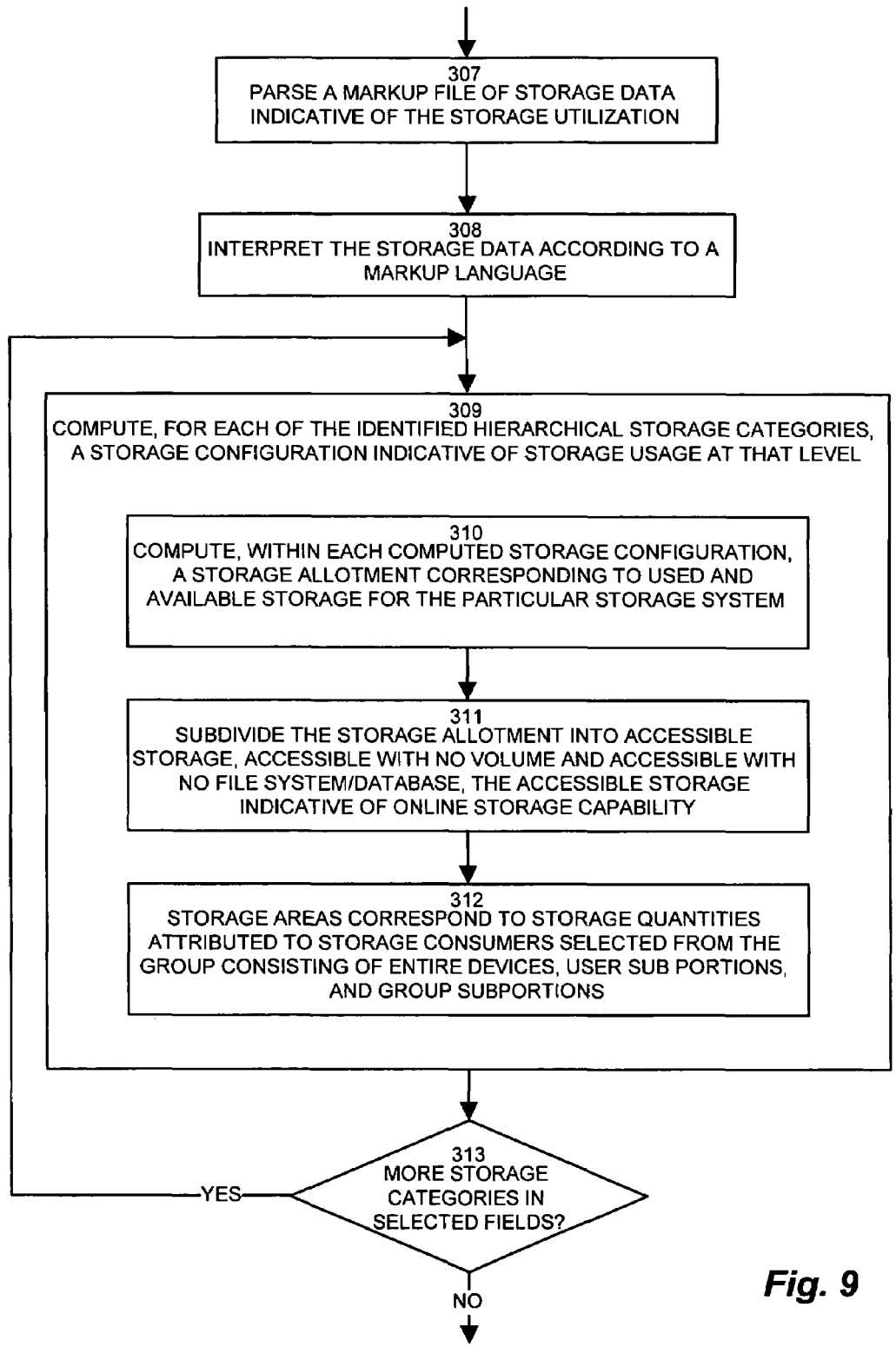
Figure 10:
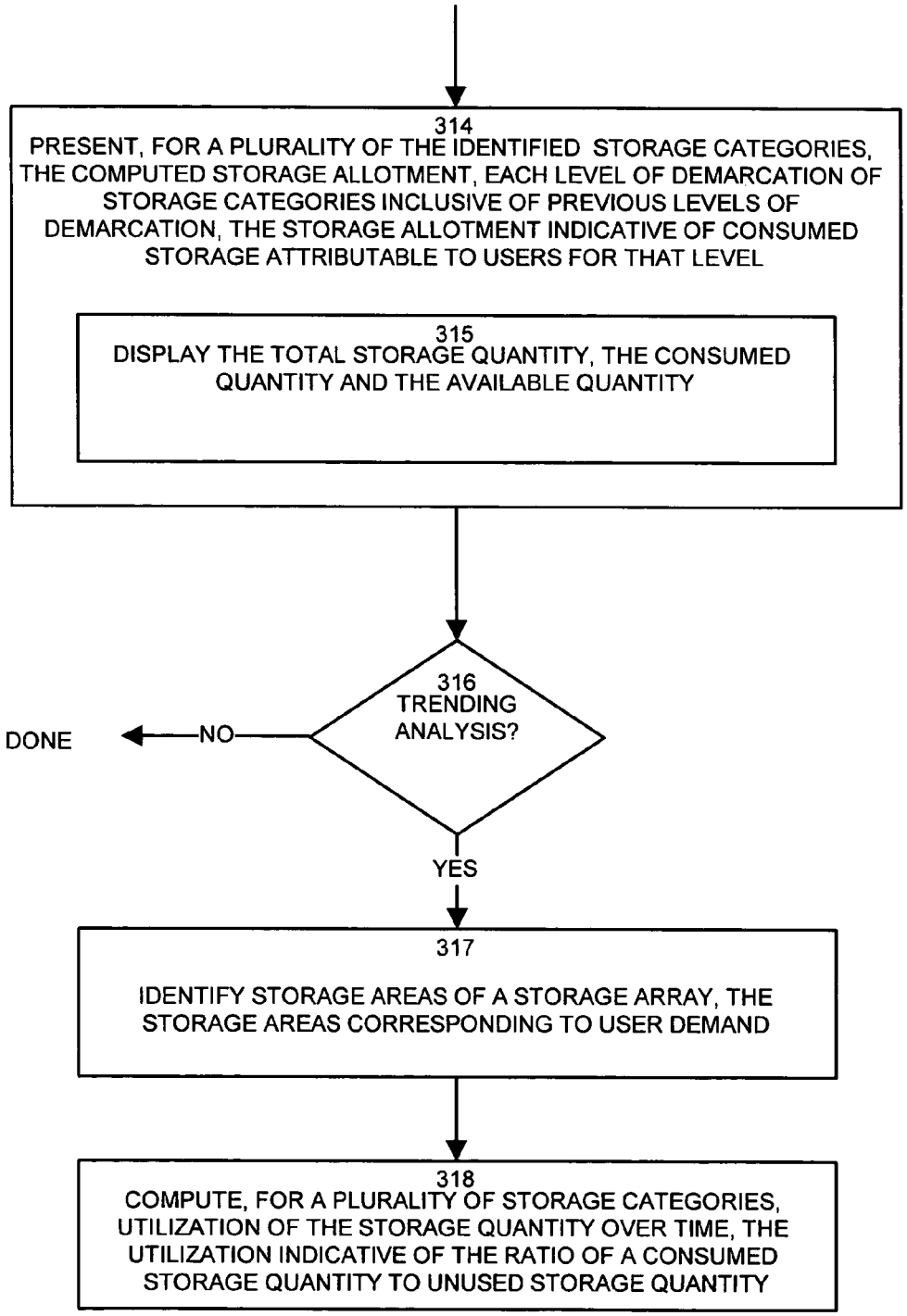

FIGS. 8-10 are a flowchart of storage utilization reporting in greater detail, describing the method of generating the storage utilization reports in the screen extractions above in FIGS. 5-7. Referring to FIGS. 1, 2, 4 and 8-10, the utilization reporter 120 identifies storage categories 150 in a storage system 164, in which the storage categories 150 correspond to a hierarchy and indicative of different levels of demarcation of the storage within the storage system 164, as depicted at step 300. Each hierarchical storage category 150 along the progression is indicative of storage capacity reserved at that level, in which reserved storage is effectively consumed and unavailable to other users of the storage, as shown at step 301. The storage categories 150, including physical storage 152, configured storage 154, allocated storage 156, logical volume storage 158, file system storage 160 and used storage 162, as depicted at step 302, define the progression illustrated in FIG. 2. The levels of demarcation, therefore, define the progression, in which each storage category 150 is inclusive of previous storage categories 150, as depicted at step 303. The progression of storage categories 150 allows the utilization reporter 120 to generate reports 146 which pinpoint available and possibly underutilized storage at any of the levels 150.

The utilization reporter 120 therefore employs storage categories 150 which are indicative of a storage quantity attributable to storage consumers, in which the consumed storage quantity is unavailable to other storage consumers in the information environment 100, as shown at step 304. The utilization reporter 120 retrieves the selected fields 516 to display from user, as depicted at step 305, iterating until each selected field 516 is gathered, as shown at step 306. As indicated above with respect to FIG. 6, requested fields 516 for columns in the report entries 166 are selected in a point-and-click manner from available fields 516.

Once retrieving the fields upon which to generate the utilization report 146, the utilization reporter 120 parses a markup file of storage data indicative of the storage utilization, as depicted at step 307. In the exemplary configuration, the utilization data is stored in an XML file or other markup file. Accordingly, the utilization reporter interprets the storage data 142 according to a markup language, as shown at step 308. The exemplary XML file includes raw storage data 140 received from the SAN for storage in the utilization data table 116. The table 116 therefore includes utilization report data 142 for computing each of the available columns 514. Alternate arrangements include relational database tables and other alternative file arrangements.

The utilization reporter 120 computes, for each of the identified hierarchical storage categories 150, a storage configuration (allotments) indicative of storage usage at that level, as depicted at step 309. Employing the selected columns 516 and the retrieved data 142 the utilization reporter 120, the utilization reporter 120 computes, for each storage category 150, the storage quantity consumed within that category. The utilization reporter 120 computes, within each computed storage configuration, a storage allotment 170 corresponding to total 172, used 174 (consumed) and available 176 storage for the particular storage system 164 and category 150, as depicted at step 310. Depending on the configuration of the particular storage category 150, computing may further include subdividing the storage allotment 170 into accessible storage 522, accessible storage used 524, accessible with no volume 526 and accessible with no file system/database 528, in which the accessible storage is indicative of online storage capability, as shown at step 311. Further, computing the allotments may include storage areas corresponding to storage quantities attributed to storage consumers selected from the group consisting of entire devices, user sub portions, and group subportions, as shown at step 312. Storage in each category 150 may be attributed to the users (consumers) of the storage individually or as a group of users, for example. A check is performed, at step 313, to determined if there are more storage categories 150 in selected fields 516, and control reverts to step 309 accordingly.

The console 112 then presents, for the identified storage categories 150 of the selected columns 516, the computed storage allotment for the storage category 150. As indicated previously, the report 520 presents the storage categories in which each level of demarcation of storage categories is inclusive of previous levels of demarcation, as depicted at step 314. Each of the presented storage allotments 170 is indicative of consumed storage attributable to users for that level (storage category) 150. The utilization reporter 120 therefore displays, for each of the storage categories 150, the storage allotment (configuration) for that level 150 including the total storage quantity 172 (allotment), the consumed quantity 174 and the available quantity 176, as shown at step 315.

The utilization reporter 120 may also compute usage trends and usage projections from a series of utilization reports 146. A check is performed, at step 316, to determine if there is a request to compute a trending analysis. If so, then the utilization reporter 120 computing a trending analysis by identifying storage areas of a storage array, in which the storage areas corresponding to user demand, or consumed storage, as shown at step 317. The utilization reporter 120 computes, for the plurality of storage categories, utilization of the storage quantity over time, in which the utilization is indicative of the ratio of a consumed storage quantity to unused storage quantity. In this manner, the SAN manager may observer trends such as storage system growth, and therefore the need for new storage systems to support additional demand. Further, underutilized storage allotments may be further employed to identify excessive apparent growth and areas for reclaiming unutilized storage.

In alternate configurations, the server 110 includes a web server for providing the graphical user interface to a remote user over a public or private access network such as the Internet, an intranet, VPN, or combination of these. The web server serves web pages, such as via HTML (Hypertext Markup Language) pages or other medium operable via a packet switched network. The server 110 builds web pages similar to the manner in which the utilization reports or other GUI based display is generated, and employs the web server 110 for delivery to a remote user, effectively employing a recipient web browser in lieu of the console 112. The web server, therefore, allows a user to employ a web browser as the console display 113 for interacting with the server 110.

The utilization report mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for reporting storage utilization as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for reporting storage utilization has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for generating storage utilization reports in a managed information environment comprising:
   identifying storage categories in a storage system, the storage categories corresponding to a hierarchy and indicative of different levels of demarcation of storage within the storage system, each hierarchical storage category indicative of storage capacity reserved at that level, reserved storage being unavailable to other users of the storage, the levels of demarcation defining a progression, each storage category inclusive of previous storage categories, the storage categories including physical storage, configured storage, allocated storage, logical volumes, file systems and used storage;
   computing, for each of the identified hierarchical storage categories, a storage configuration indicative of storage usage at that level;
   computing, within each computed storage configuration, a storage allotment corresponding to used and available storage for the particular storage system;
   subdividing the storage allotment into accessible storage, accessible with no volume group considerations and accessible with no file system/database, the accessible storage indicative of online storage capability; and
   presenting, for a plurality of the identified storage categories, the computed storage allotment, each level of demarcation of storage categories inclusive of previous levels of demarcation, the storage allotment indicative of consumed storage attributable to users for that level, further comprising, for each storage category:
   computing the storage quantity consumed within that category;
   displaying the total storage quantity, the consumed quantity and the available quantity; and
   computing a trending analysis by:
   identifying storage areas of a storage array, the storage areas corresponding to user demand; and
   computing, for a plurality of storage categories, utilization of the storage quantity over time, the utilization indicative of the ratio of a consumed storage quantity to unused storage quantity for a particular storage area.

2. The method of claim 1, wherein each of the storage categories are indicative of a storage quantity attributable to storage consumers, the consumed storage quantity being unavailable to other storage consumers.

3. The method of claim 1, wherein the storage areas correspond to storage quantities attributed to storage consumers selected from the group consisting of entire devices, user sub portions, and group subportions.

4. The method of claim 1, wherein computing further comprises:
   parsing a markup file of storage data indicative of the storage utilization; and
   interpreting the storage data according to a markup language.

5. A network management device for generating storage utilization reports in a managed information environment comprising:
   a utilization reporter operable to identify storage categories in a storage system, the storage categories corresponding to a hierarchy and indicative of different levels of demarcation of the storage within the storage system, the levels of demarcation defining a progression, each storage category inclusive of previous storage categories, the storage categories including physical storage, configured storage, allocated storage, logical volumes, file systems and used storage, the utilization reporter further operable to:
   compute, for each of the identified hierarchical storage categories, a storage configuration indicative of storage usage at that level each hierarchical storage category indicative of storage capacity reserved at that level, reserved storage being unavailable to other users of the storage; and
   compute, within each computed storage configuration, a storage allotment corresponding to used and available storage for the particular storage system, the storage on the storage system further subdividing the storage allotment into accessible storage, accessible with no volume group considerations and accessible with no file system/database, the accessible storage indicative of online storage capability, the storage allotment further comprising:
   allocated storage, the allocated storage reclaimable for use by another storage category; and
   allotted storage, the allotted storage employed for active data storage;
   a console display coupled to the utilization reporter and operable to present, for a plurality of the identified storage categories, the computed storage allotment, each level of demarcation of storage categories inclusive of previous levels of demarcation, the storage allotment indicative of consumed storage attributable to users for that level, the utilization reporter further operable to:

compute, for each storage category, the storage quantity consumed within that category;

display the total storage quantity, the consumed quantity and the available quantity for each of the storage categories identify storage areas of a storage array, the storage areas corresponding to user demand; and compute, for a plurality of storage categories, a trending analysis indicative of utilization of the storage quantity over time, the utilization indicative of the ratio of a consumed storage quantity to unused storage quantity for a storage area.

6. The device of claim 5, wherein each of the storage categories are indicative of a storage quantity attributable to storage consumers, the consumed storage quantity being unavailable to other storage consumers.

7. The device of claim 6 further comprises an interface to a utilization report database having storage data, the utilization reporter further operable to:

parse a markup file of storage data indicative of the storage utilization; and interpret the storage data according to a markup language.

8. The device of claim 5 wherein the storage areas on a storage system correspond to storage quantities attributed to storage consumers selected from the group consisting of entire devices, user sub portions, and group subportions.

9. A method for generating storage utilization reports in a managed information environment comprising:

identifying storage categories in a storage system, the storage categories indicative of levels of demarcation of a storage quantity within the level, each the storage categories indicative of a storage quantity attributable to storage consumers;

computing, for each of the identified storage categories, a storage configuration indicative of consumed storage at that level, consumed storage being unavailable to other storage consumers;

presenting, for each storage category, the computed storage configuration attributable to each of a plurality of the storage consumers, each level of demarcation of storage categories inclusive previous levels of demarcation, the storage configuration indicative of consumed storage attributable to each of the storage consumers for that level;

presenting a selection of available storage categories and storage allotments within each of the storage categories, the storage categories indicative of a hierarchical structure of consumed storage on a storage device;

subdividing the storage allotment into accessible storage, accessible with no volume group considerations and accessible with no file system/database, the accessible storage indicative of online storage capability;

receiving a selection of fields indicative of the available storage categories and storage allotments for display as columns on a storage utilization report;

computing, for each of the storage categories, the storage configuration corresponding to the storage allotment in each storage category, the storage allotment indicative of the used, available, and total storage within the particular storage category; and displaying, in a simultaneous manner, the computed storage configuration including the selected storage allotment in each of a plurality of the selected storage categories.

10. A computer program product having a computer readable storage medium operable to store computer program logic embodied in an encoded set of processor based instructions including computer program code encoded thereon for generating storage utilization reports in a managed information environment comprising:

computer program code for identifying storage categories in a storage system, the storage categories corresponding to a hierarchy and indicative of different levels of demarcation of the storage within the storage system;

computer program code for computing, for each of the identified hierarchical storage categories, a storage configuration indicative of storage usage at that level;

computer program code for computing, within each computed storage configuration, a storage allotment corresponding to used and available storage for the particular storage system; and computer program code for presenting, for a plurality of the identified storage categories, the computed storage allotment, each level of demarcation of storage categories inclusive of previous levels of demarcation, the storage allotment indicative of consumed storage attributable to users for that level; and computer program code for subdividing the storage allotment into accessible storage, accessible with no volume group considerations and accessible with no file system/database, the accessible storage indicative of online storage capability.

11. A computer program product having a computer readable storage medium including an encoded set of processor based instructions having program code which, when executed by a computer, cause the computer to perform steps for generating storage utilization reports in a managed information environment comprising:

program code for identifying storage categories in a storage system, the storage categories corresponding to a hierarchy and indicative of different levels of demarcation of the storage within the storage system;

program code for computing, for each of the identified hierarchical storage categories, a storage configuration indicative of storage usage at that level;

program code for computing, within each computed storage configuration, a storage allotment corresponding to used and available storage for the particular storage system;

program code for presenting, for a plurality of the identified storage categories, the computed storage allotment, each level of demarcation of storage categories inclusive of previous levels of demarcation, the storage allotment indicative of consumed storage attributable to users for that level; and program code for subdividing the storage allotment into accessible storage, accessible with no volume group considerations and accessible with no file system/database, the accessible storage indicative of online storage capability.

12. A storage utilization server for generating storage utilization reports in a managed information environment comprising:

means for identifying storage categories in a storage system, the storage categories corresponding to a hierarchy and indicative of different levels of demarcation of the storage within the storage system, each hierarchical storage category indicative of storage capacity reserved at the level, reserved storage being unavailable to other users of the storage, the levels of demarcation defining a progression, each storage category inclusive of previous storage categories, the storage categories including physical storage, configured storage, allocated storage, logical volumes, file systems and used storage;

means for computing, for each of the identified hierarchical storage categories, a storage configuration indicative of storage usage at that level;

means for computing, within each computed storage configuration, a storage allotment corresponding to used and available storage for the particular storage system, the means for computing the storage allotment further comprising:

means for computing allocated storage, the allocated storage reclaimable for use by another storage category; and means for computing allotted storage, the allotted storage employed for active data storage;

means for subdividing the storage allotment into accessible storage, accessible with no volume group considerations and accessible with no file system/database, the accessible storage indicative of online storage capability; and means for presenting, for a plurality of the identified storage categories, the computed storage allotment, each level of demarcation of storage categories inclusive of previous levels of demarcation, the storage allotment indicative of consumed storage attributable to users for that level, further comprising, for each storage category:

means for computing the storage quantity consumed within that category;

means for displaying the total storage quantity, the consumed quantity and the available quantity; and means for computing a trending analysis by:

identifying storage areas of a storage array, the storage areas corresponding to user demand; and computing, for a plurality of storage categories, utilization of the storage quantity over time, the utilization indicative of the ratio of a consumed storage quantity to unused storage quantity for a particular storage area.

* * * * *